United States Patent [19]

Matlock

[11] 4,122,817

[45] Oct. 31, 1978

[54] INTERNAL COMBUSTION VALVE HAVING AN IRON BASED HARD-FACING ALLOY CONTACT SURFACE

[75] Inventor: Wallace M. Matlock, Highland Heights, Ohio

[73] Assignee: TRW Inc., Cleveland, Ohio

[21] Appl. No.: 810,407

[22] Filed: Jun. 27, 1977

Related U.S. Application Data

[63] Continuation-in-part of Ser. No. 573,430, May 1, 1975, abandoned.

[51] Int. Cl.$^2$ .................. F01L 3/04; C22C 38/44; B32B 15/18
[52] U.S. Cl. .................. 123/188 AA; 75/128 D; 75/128 W; 428/679; 428/682; 428/939
[58] Field of Search .................. 123/188 AA; 75/122, 75/128 D, 128 W; 148/35, 38; 428/679, 682, 683, 684, 685, 687, 939; 219/145, 146

[56] References Cited

U.S. PATENT DOCUMENTS

| | | | |
|---|---|---|---|
| 2,292,740 | 8/1942 | Cape | 75/128 W |
| 2,671,726 | 3/1954 | Lennings | 75/128 W |
| 2,881,750 | 4/1959 | Hanink | 123/188 AA |
| 3,795,810 | 3/1974 | Davies et al. | 123/188 AA |
| 3,813,509 | 5/1974 | Woods et al. | 219/146 |

FOREIGN PATENT DOCUMENTS 276,653 3/1962 Netherlands .................. 75/128 W

OTHER PUBLICATIONS

"Metals Handbook," ASM, vol. 1, 8th ed. 1969 p. 409

Primary Examiner—Arthur J. Steiner

[57] ABSTRACT

A valve for an internal combustion engine having a contact surface formed of an alloy which exhibits satisfactory wear properties, PbO corrosion resistance and oxidation resistance, and is less expensive than cobalt containing alloys used for the same purpose. The alloy contains carbon, preferably 1.4 to 2.0wt.%, molybdenum, preferably 4.0 to 6.0wt.%, silicon, preferably 0.1 to 1.0wt.%. nickel, preferably 8 to 13wt.%, chromium, preferably 20 to 26wt.%, manganese, preferably 0 to 3.0wt.%, with the balance being iron.

6 Claims, 5 Drawing Figures

INTERNAL COMBUSTION VALVE HAVING AN IRON BASED HARD-FACING ALLOY CONTACT SURFACE

This application is a continuation-in-part of application Ser. No. 573,430 filed May 1, 1975 and now abandoned.

The present invention pertains to an iron base nickel-chromium hard facing alloy exhibiting good wear properties, resistance to PbO corrosion, and oxidation resistance in a relatively low cost composition. The alloy of the invention is particularly suitable for utilization as a hard-facing alloy to face contact surfaces of exhaust valves of internal combustion engines, although it will be appreciated that the alloy has other uses. Generally, the alloy of the present invention is useful wherever a high performance alloy is required for use at high temperature and under corrosive conditions. This type of service is required, for example, of the valves and associated parts such as valve seats and inserts, which are directly exposed to the high termperatures and the corrosive products of combustion of internal combustion engines. Generally, these parts must withstand exposure to corrosive gases passing thereover at high pressure and at temperatures ranging from about 538° C. (1000° F.) or higher, at different parts of the cycle.

The introduction of so-called lead free gasoline, and changes in engine design to reduce combustion temperatures have alleviated somewhat the corrosion resistance and high temperature resistance requirements for such metals. The corrosive action of the lead compounds in the gasoline has correspondingly been reduced, if not entirely eliminated. Most so-called lead-free fuels are supplied against a specification that accepts 0.05 maximum grams of lead per gallon of gasoline, as compared to about 3.0 grams of lead per gallon for leaded fuels. Therefore, the lead corrosion problem is reduced, although not entirely eliminated, with lead-free fuels. However, the reduction in or elimination of the lead content also has correspondingly reduced or eliminated the lubricating effect of lead compounds in the fuel. Consequently, the abrasive wear-resistance requirement of the valve facing material has been increased.

A commonly used hard-facing alloy for exhaust valve facings are the Stellite alloys, which are cobalt-chromium facing alloys commonly used in applications where an unfaced austenitic stainless steel valve is otherwise subject to severe face wear and corrosion. The various Stellite alloys possess excellent high temperature wear resistance, resistance to PbO corrosion and oxidation resistance. However, the Stellite alloys are expensive materials due to their high content of expensive metals such as cobalt, nickel and tungsten. The basic Stellite composition is a non-ferrous alloy of 40-80% cobalt, 0 to 25% tungsten, 20-35% chromium and 0.75 to 2.5% carbon.

As will be demonstrated, valve facings formed with iron based alloys of the present invention compare very favorably with facings formed from a Stellite alloy. This is a remarkable accomplishment when it is realized that this high level of performance is achieved at a substantial cost saving when compared with the Stellite alloy.

A more detailed description of the invention is facilitated by reference to the drawings which form a part of this specification and wherein.

Figure 1:
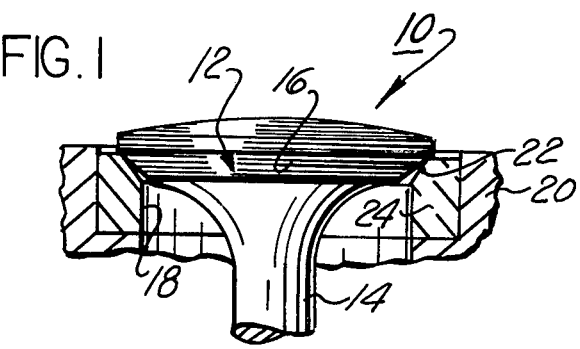
FIG. 1 is a fragmentary elevational view in partial section of a valve head seated in a valve seat.

Referring now to FIG. 1, there is shown a partial view in partial section of a valve 10 having a head 12 and a stem 14 (broken away). Head 12 has a contact surface 16 which is bevelled for gas-seating engagement with a valve seat surface. A valve opening 18 is formed in an engine block 20, and has a valve seating surface 22 formed thereon. Valve seating surface 22 is formed as part of a valve insert 24, which may be made of a metal having better corrosion and wear resistance and harder then the cast iron metal of which the engine cylinder block or head 20 is usually made. Valve opening 18 is usually a circular opening, and valve insert 24 is generally a ring-shaped insert provided therein.

Figure 2:
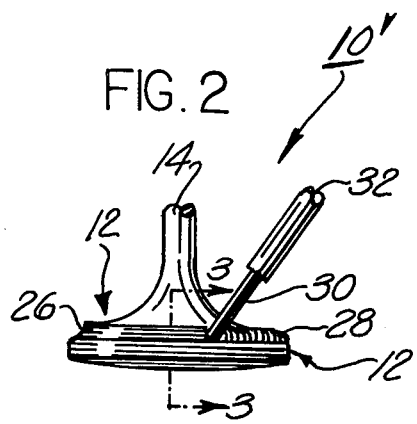
FIG. 2 is a partial, schematic view showing a hard-facing alloy being applied by welding techniques to a valve head.
Figures 3, 3A, 3B:
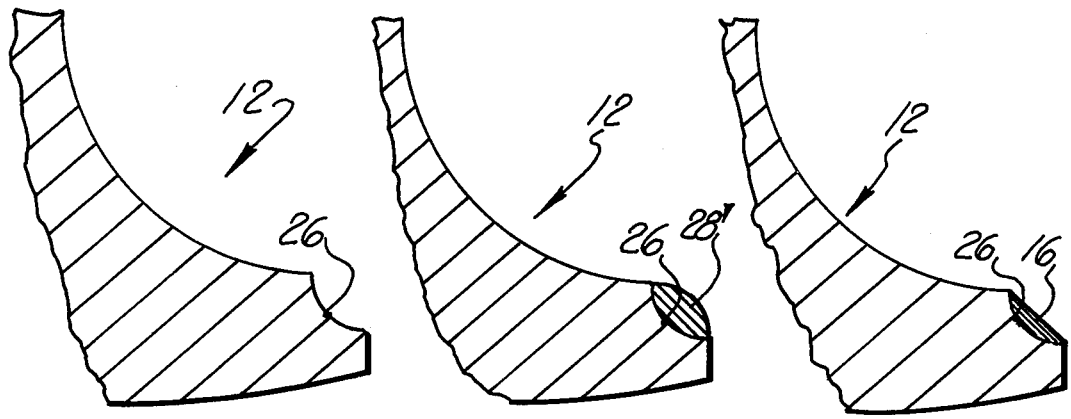
FIGS. 3, 3A and 3B are partial section views taken along line 3—3 of FIG. 2, showing the steps in applying a hard-facing alloy to the valve head.

Referring to FIG. 2, valve 10 may be formed from a valve blank 10' having a groove 26 encircling the periphery thereof. Groove 26 provides a site for the deposition of a hard-facing alloy 28 therein. Alloy 28 may be applied by welding techniques which deposit the alloy from a welding rod 30 fed from a suitable welding device 32. As shown in FIGS. 3 and 3A, the hard-facing alloy is deposited within groove 26 as a weld bead 28'. Bead 28' is thereafter machined to form a valve seat having contact surface 16 which is adapted to periodically enter into gas-sealing engagement with valve seating surface 22. Valve 10 is thereby provided with contact surface 16 formed in a hard-facing alloy deposit welded to valve head in the valve seat area 16.

The facing alloy of the invention may be applied by the known welding processes, including plasma arc, MIG (metal arc-inert gas), TIG (tungsten arc-inert gas) or oxyacetylene. Such processes may conveniently be automated to proved a high rate of production of hard-faced engine valves.

Valve blanks employed in the practice of the invention can be formed of a variety of conventional alloys, representative examples of which are identified below.

Similarly, the composition and proportion of ingredients in the weld wire or other primary source of weld metal can vary over reasonably wide limits.

What is critically important is that the weld metal deposited on the valve head, and particularly the contact surface formed therein contain the following ingredients in the proportions indicated:

| Element | Wt. % |
| --- | --- |
| C | 1.4–2.0 |
| Mo | 4.0–6.0 |
| Ni | 8–13 |
| Cr | 20–26 |
| Si | 0.1–1.0 |
| Mn | 0–3.0 |
| Fe | balance |

It will be appreciated by those skilled in the art that a contact surface having the desired proportions of metallurgical ingredients can be realized by interplaying valve blank metallurgy, weld wire metallurgy, and welding conditions. Thus, increasing the energy supplied during welding, increases by dilution the metallurgical contribution to the weld metal of ingredients contained in the valve blank. Conversely, decreasing the energy supplied during welding will decrease the contribution made by the valve blank and a compensating adjustment may have to be made in the composition of the weld wire or other primary source of weld metal to provide a contact surface having the desired composition.

Suitable alloys from which may be formed valve blanks useful in the practice of the invention, including the following:

21-2

| Element | Wt.% |
|---|---|
| C | 0.5–0.6 |
| Mn | 7–9.5 |
| Si | 0.25 max. |
| P | 0.05 max. |
| S | 0.04–0.09 |
| Cr | 19.25–21.5 |
| Ni | 1.5–2.75 |
| N | 0.2–0.4 |
| Fe | balance |

21-4

| Element | Wt.% |
|---|---|
| C | 0.475–0.575 |
| Mn | 8–10 |
| Si | 0.25 max. |
| P | 0.03 max. |
| S | 0.04–0.09 |
| Cr | 20–22 |
| Ni | 3.25–4.50 |
| N | 0.38–0.5 |
| Fe | balance |

Inconel 751

| Element | Wt.% |
|---|---|
| C | 0.1 max. |
| Mn | 1.0 max. |
| Si | 0.5 max. |
| Cr | 14–17 |
| Ti | 2.0–2.6 |
| Al | 0.9–1.5 |
| Fe | 5–9 |
| Ni | 70 min. |
| S | 0.01 max. |
| Cu | 0.5 max. |
| Cb+Ta | 0.7–1.2 |

1541

| Element | Wt.% |
|---|---|
| C | 0.35–0.45 |
| Mn | 1.25–1.65 |
| Si | 0.15–0.30 |
| P | 0.040 max. |
| S | 0.050 max. |
| Fe | balance |

ENGINE TEST FOR WEAR AND OXIDATION RESISTANCE

Valve Preparation

A series of valve blanks formed from the alloy identified above as 21-2, and having heads measuring 40 mm. in diameter, were provided with an iron based hard-facing alloy by plasma arc welding the seat area of the valve, using a 2.4 mm. diameter tube wire having the following composition:

| Element | Wt. % |
|---|---|
| C | 2.38% |
| Mn | 0.05% |
| Si | 0.79% |
| Cr | 26.32% |
| Ni | 11.15% |
| Mo | 5.38% |
| P | 0.01% |
| S | 0.022% |
| Fe | balance |

The welding parameters include the following:

| | |
|---|---|
| Cycle speed | 28 sec. |
| Welding current (steady) | 125 amp. |
| Wire rate | 12 mm/sec. |
| Polarity | straight |
| Torch stand-off | 5.9 mm |
| Plasma gas rate | 15.9 mm³/sec. |
| Shield gas | 50:50 A & He |

Pretreatment of the valve blanks and post treatment of the hard-face valves followed conventional production practices well known to those skilled in the art.

The composition of the weld metal deposit measured at the contact surface of the valve head was determined to be:

| Element | Wt % |
|---|---|
| C | 1.70 |
| Mo | 3.91 |
| Ni | 9.15 |
| Cr | 24.03 |
| Si | 0.52 |
| Mn | 1.39 |
| Fe | Balance |

It was calculated that this composition resulted from about an 18% dilution of the tube wire composition with the composition of the valve blank.

For purposes of comparison a second series of 21-2 valve blanks were provided with a Stellite F hard facing using production techniques. This entailed oxyacetylene welding the valve seat areas using a welding rod having the following composition:

| Element | Wt. % |
|---|---|
| C | 1.5–2.0 |
| Mn | 0.3 max |
| Si | 0.9–1.3 |
| Cr | 24–27 |
| Mi | 21–24 |
| Mo | 0.6 max |

Since the oxyacetylene welding process results in minimal dilution, the composition at the contact surface of these valves was deemed to approximate the composition of the Stellite F welding rod.

Engine Test

Twelve valves having hard facings corresponding to the present invention, and twelve with Stellite F facings were tested in three separate 100-hour tests in a heavy duty truck engine. In the first test, all eight exhaust valve positions were fitted with valves of the present invention. In the second test, all eight exhaust valve positions were fitted with valves faced with Stellite F. In the third test, valves of the present invention were fitted as exhaust valves in cylinder positions 2, 4, 6 and 8, and the Stellite F faced valves were fitted as exhaust valves in cylinder positions 1, 3, 5 and 7.

The fuel used in the three tests had a typical lead content of 0.0003 gm/liter (0.001gm/gal) which places it within the category of "lead free" fuels.

The engine operating parameters, including speed, load, timing and air fuel ratio were kept constant throughout the tests, so that as far as possible all variables were eliminated, save for the exhaust valve facing alloy.

An examination of the exhaust valves following the three tests revealed that:

Eleven of the 12 valves produced in accordance with the present invention showed zero face recession, i.e., no wear of the contact surface. The twelfth valve so produced showed some wear along a 160° arc of its contact surface, measuring a maximum of 0.107 mm. This amount of wear is considered to be minimal.

All 12 of the exhaust valves faced with Stellite F showed zero wear.

None of the 24 exhaust valves employed in the tests showed any signs of oxidative deterioration.

It is clear from these test results that exhaust valves provided with iron based hard-facing alloys of the present invention are fully comparable in terms of wear and oxidation resistance, under the test conditions described, to the substantially more expensive and highly regarded Stellite F facings of the prior art.

BENCH TEST FOR PbO CORROSION RESISTANCE

Specimen Preparation

Specimens were prepared from rod stock measuring about 11.3 mm (0.444 in.) in diameter, and having compositions corresponding to 4140, 1541 and Inconel 751 identified above.

The rod stock was ground down to provide a 9.7 mm (0.38 in.) flat which was hand puddled with plasma arc welding equipment using the same tube wire identified above. Welding conditions were set to provide minimal dilution.

The weld metal deposit was ground down to a thickness of 2.5 mm (0.100 in.) to simulate a valve contact surface. The remaining deposit was separated from the rod stock to provide corrosion test specimens and analyzed with the following results:

| Element | Rod Stock Wt. % | | |
|---|---|---|---|
| | 4140 | 1541 | I-751 |
| C | 2.14 | 2.17 | 2.02 |
| Mo | 4.60 | 4.91 | 4.83 |
| Ni | 11.42 | 9.82 | 10.98 |
| Cr | 25.5 | 26.2* | 26.7* |
| Si | .81 | .83 | .84 |
| Mn | 0.23 | 0.25 | 0.21 |
| Fe | bal. | bal. | bal. |

*While these values are slightly higher than the preferred upper limit of 26% it is believed that the analysis values are artifically high due to interference of Mo with X-ray diffraction read-outs.

PbO Corrosion Test

The test procedure employed is the one reported at Corrosion Vol. 12 No. 1, January, 1956, in an article by Tauschek and Allen entitled "Corrosion of Gasoline Engine Exhaust Valve Steels."

Briefly, the procedure involves placing a weighed specimen in a magnesia crucible together with 40 grams of PbO. The crucible is then heated to 913° C. (1675° F.) for one hour in air. Upon cooling, the treated specimen is again weighed and the weight loss, expressed in $gm/dm^2/hr.$, determined.

In general, weight losses of up to 50 $gm/dm^2/hr.$ have been found to correlate with satisfactory PbO corrosion resistance exhibited in engine tests.

The average weight loss values obtained for the weld specimens removed from 4140, 1541 and I-751 were, respectively, 26.4, 28.2 and 25.6 $gm/dm^2/hr.$ These very satisfactory values compare favorably with 15 $gm/dm^2/hr.$ for Stellite F, the highly satisfactory but expensive facing alloy known to the prior art.

While valves faced with the iron base alloy of the present invention may be used in gasoline engines burning leaded fuel, (containing up to about 3 gm/gal Pb), lead free fuel (containing not substantially in excess of 0.05 gm/gal Pb), and in engines burning diesel fuel, it is recommended that the Si content of the facing alloy be kept low where the valve will see the combustion products of leaded fuel.

Thus, where any engine is designed to burn either lead free of diesel fuel the Si content of the valve facing alloy may reach the upper limit of 1.0 wt%. However, where an engine is designed to burn leaded fuel, it is recommended that the Si content of the facing alloy be kept to a valve within the range of about 0.1wt% to about 0.5wt%.

What is claimed is:

1. An internal combustion engine valve having a body, a head, and a contact surface disposed on said head adapted to periodically enter into gas-sealing engagement with a valve seat, said contact surface being formed in a metal deposit welded to said valve head, the composition of said metal deposit, measured at said contact surface, consisting essentially of

| Element | Wt. % |
|---|---|
| C | 1.4–2.0 |
| Mo | 4.0–6.0 |
| Ni | 8–13 |
| Cr | 20–26 |
| Si | 0.1–1.0 |
| Mn | 0–3.0 |
| Fe | balance |

2. The valve defined in claim 1 wherein said valve body and head are formed from a composition consisting essentially of:

| Element | Wt.% |
|---|---|
| C | 0.5–0.6 |
| Mn | 7–9.5 |
| Si | 0.25 max. |
| P | 0.5 max. |
| S | 0.04–0.09 |
| Cr | 19.25–21.5 |
| Ni | 1.5–2.75 |
| N | 0.2–0.4 |
| Fe | balance |

3. The valve defined in claim 1 wherein said valve body and head are formed from a composition consisting essentially of:

| Element | Wt. % |
|---|---|
| C | 0.475–0.575 |
| Mn | 8–10 |
| Si | 0.25 max. |
| P | 0.03 max. |
| S | 0.04–0.09 |
| Cr | 20–22 |
| Ni | 3.25–4.50 |
| N | 0.38–0.5 |
| Fe | balance |

4. The valve defined in claim 1 wherein said valve body and head are formed from a composition consisting essentially of:

| Element | Wt. % |
| --- | --- |
| C | 0.1 max. |
| Mn | 1.0 max. |
| Si | 0.5 max. |
| Cr | 14–17 |
| Ti | 2.0–2.6 |
| Al | 0.9–1.5 |
| Fe | 5–9 |
| Ni | 70 min. |
| S | 0.01 max. |
| Cu | 0.5 max. |
| Cb+Ta | 0.7–1.2 |

5. The valve defined in claim 1 wherein said valve body and head are formed from a composition consisting essentially of:

| Element | Wt. % |
| --- | --- |
| C | 0.35–0.45 |
| Mn | 1.25–1.65 |
| Si | 0.15–0.30 |
| P | 0.04 max. |
| S | 0.05 max. |
| Fe | balance |

6. The valve defined in claim 1, suitable for use in engines burning gasoline up to about 3 gm/gallon of Pb, wherein the concentration of Si is within the range of about 0.1 wt.% to about 0.5 wt.%.

* * * * *